United States Patent

Kurokawa et al.

Patent Number: 6,120,893
Date of Patent: Sep. 19, 2000

[54] IMAGE RECEIVING SHEET

[75] Inventors: Shinichi Kurokawa; Masafumi Hayashi, both of Skinjuku-Ku, Japan

[73] Assignee: Dai Nippon Printing Co., Ltd., Japan

[21] Appl. No.: 09/203,528

[22] Filed: Dec. 1, 1998

[30] Foreign Application Priority Data

Dec. 3, 1997 [JP] Japan ................................. 9-347310

[51] Int. Cl.[7] ...................................................... B32B 3/00

[52] U.S. Cl. ........................ 428/354; 428/195; 428/447; 428/480; 428/913; 428/914

[58] Field of Search ................................ 428/354, 446, 428/447, 480, 913, 914, 195

[56] References Cited

U.S. PATENT DOCUMENTS

| | | | |
|---|---|---|---|
| 5,330,961 | 7/1994 | Takeyama et al. | 503/227 |
| 5,437,913 | 8/1995 | Asaka et al. | 428/195 |
| 5,677,049 | 10/1997 | Torii | 428/321.5 |

*Primary Examiner*—Daniel Zirker
*Attorney, Agent, or Firm*—Parkhurst & Wendel, L.L.P.

[57] ABSTRACT

The present invention provides an image receiving sheet having a good conveyance property in an electrophotographic copier or printer, having no flaw or dirt and having a superior image quality, characterized in that the image receiving sheet includes an image receiving layer 3 on one surface of a substrate 2 and a backing layer on other surface of the substrate 2 and that the backing layer includes a binder, a component of a silicon containing compound and a particle.

9 Claims, 1 Drawing Sheet

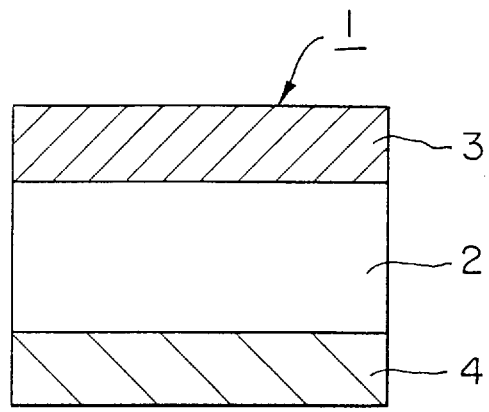
F I G. 1
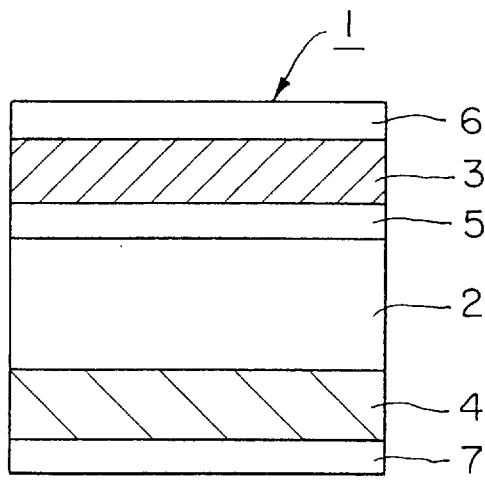
F I G. 2
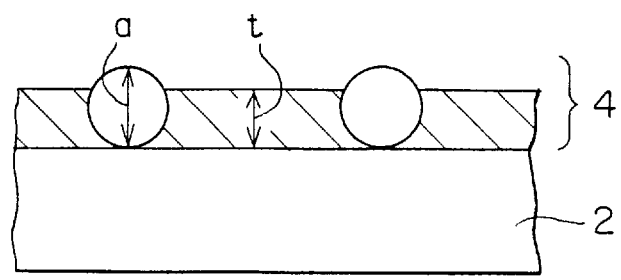
F I G. 3

IMAGE RECEIVING SHEET

FIELD OF THE INVENTION

The present invention relates to an image receiving sheet, and more particularly to an image receiving sheet used in an electrophotographic system, in which an image receiving layer is provided on one surface of a substrate and a backing layer is provided on a back surface of the substrate. In the image receiving sheet according to the invention, a conveyance property of the sheet in a machine is good since the backing layer contains a silicon compound component in a binder and furthermore touch feeling after imaging is superior since particles are dispersed.

BACKGROUND OF THE INVENTION

Recently, there has been put to practical use a method for producing a full-colored image by mixing toners of three colors, i.e. yellow, magenta and cyan, or four colors in which black is added to the above-mentioned three colors with use of the electrophotographic system.

Image receiving sheets used in the electrophotographic system generally have a constitution such that an image receiving layer is formed on a substrate since recording information such as character or image should be surely preserved. This kind of image receiving sheets are used as information transmission means for OHP (overhead projector) useful for example in lecture meetings, schools, enterprises, as well as other meetings and exhibitions.

However, the image receiving sheets used in the conventional electrophotographic systems tend to occur conveyance errors in a printer and cause problems such as paper jamming since an electrophotographic copier or printer has one characteristics of mass imaging function, thus conveyance routes for the image receiving sheets become complex, such as cassettes and manual insertion.

In order to improve the conveyance property of the image receiving sheets, a backing layer with dispersed wax or silicon etc. is provided. However, there are occurred problems therein such that free silicon in the back surface causes setoff on an image receiving layer during storage of the sheet to cause deterioration of an image quality.

In the electrophotographic copier or printer, an oily feeling is obtained on an imaged product due to silicon oil adhered during thermal fixing of toners. Thus touch feeling becomes bad and a good image cannot be maintained unless an intermediate paper being put therebetween. In order to prevent the oily feeling, dispersing of a filler or silica on both front and back surfaces of the image receiving sheet is effective. However, if too much dispersed, there are caused problems such that transparency of the sheet may be lost, that added particles may be peeled off from a binder due to mutual rubbing of the sheets, and that flaws or dirt may be produced on the sheet.

Furthermore, it becomes meaningless unless a relationship between a particle size and a coated amount of the binder in the backing layer is taken into consideration. For example, if the particle size is almost equal to the coated amount (coated thickness), oily feeling cannot be prevented.

Thus, an object of the present invention, in order to solve the above-mentioned problems, is to provide an image receiving sheet having a good conveyance property in an electrophotographic copier or printer, having no flaw or dirt and having a superior image quality.

SUMMARY OF THE INVENTION

To accomplish the above-mentioned object, the present invention is characterized in that an image receiving sheet has an image receiving layer on one surface of a substrate and a backing layer on other surface of the substrate and in that the backing layer contains a binder, a component of a silicon containing compound and a particle.

Furthermore, the above-mentioned component of a silicon containing compound is preferably a cured (hardened) or polymerized silicon containing compound (for example, graft polymer or block polymer).

More concretely, it is preferable that the backing layer is formed by applying a coating solution in which one or more silicon containing isocyanate compound(s) expressed by the following general formula (1) be contained as a lubricant, and heating and drying it.

$$R_n-Si-(NCO)_{4-n} \qquad (1)$$

(wherein n denotes an integer of 0, 1, 2 or 3, and R is substituted or unsubstituted alkyl group, aryl group or vinyl group.

Furthermore, it is preferable in the present invention that at least one kind of a binder resin constituting the above-mentioned backing layer have active hydrogen.

Moreover, it is preferable that the above-mentioned particle is a spherical organic fine particle.

In addition, an added amount of the above-mentioned particle is preferably 0.1–5%.

In addition, it is preferable that the above-mentioned particle size (a) and the coated amount (coated thickness) of the backing layer (t) should have relationships of $0.5a \leq t < a$ and $a - t \geq 0.5 \mu m$.

Furthermore, kinetic (dynamic) friction coefficient caused by piling of two image receiving sheets on front and back sides thereof is preferable within a range of 0.1–0.5.

In the image receiving sheet having an image receiving layer on one surface of a substrate and a backing layer on other surface of the substrate according to the present invention, a component of a silicon containing compound, and a particle are contained in a binder of the backing layer. In a particularly preferred embodiment of the invention, an isocyanate compound expressed by the general formula (1) as the component of a silicon containing compound is contained as a lubricant. Thereby, a binder resin having a reactive group for the backing layer and the isocyanate compound are reacted and cured when heating and drying of the backing layer. Furthermore, the particle is dispersed and fixed by the reacted and cured binder resin.

Therefore, the image receiving sheet can be obtained, by which conveyance property in the electrophotographic copier or print becomes better, no flaw or dirt is present on the surface, a part of the backing layer is not subjected to setoff on the image receiving layer and a superior image quality is produced.

BRIEF DESCRIPTION OF THE DRAWINGS

FIG. 1 is a longitudinal cross-sectional view illustrating one embodiment of an image receiving sheet according to the present invention.

FIG. 2 is a longitudinal cross-sectional view illustrating another embodiment of an image receiving sheet according to the present invention.

FIG. 3 is a schematic cross-sectional view illustrating the relationship between a particle size of the backing layer and a coated amount (coated thickness) of a binder resin in the backing layer.

DETAILED DESCRIPTION OF THE PREFERRED EMBODIMENT

Preferred embodiments of the present invention will be explained as follows based on the drawings.

FIG. 1 is a longitudinal cross-sectional view illustrating one embodiment of an image receiving sheet according to the present invention.

An image receiving sheet 1 has an image receiving layer 3 on one surface of a substrate 2 and a backing layer 4 provided on other surface of the substrate 2.

Furthermore, FIG. 2 is a longitudinal cross-sectional view illustrating another embodiment of an image receiving sheet according to the present invention. In this embodiment, the image receiving sheet has such a constitution that a primer layer 5, an image receiving layer 3 and an antistatic layer 6 are provided on one surface of a substrate 2 in the described order starting from the substrate 2 and that a backing layer 4 and an antistatic layer 6 are provided on other surface of the substrate 2 in the described order starting from the substrate 2.

Substrate

As the substrate 2 used in the image receiving sheet according to the invention, those made of thermoplastic resins having transparency, thermal resistance, size stability and rigidity are preferable in applications of the image receiving sheet for observing recorded images by means of transmitted light such as OHP sheets. Concretely, examples of the substrate may include films or sheets having a thickness of about 10–250 $\mu$m, preferably about 50–180 $\mu$m, of polyethylene terephthalate resin, polycarbonate resin, acrylic resin, polyvinyl chloride resin, polypropylene resin, polystyrene resin, polyethylene resin, cellulose diacetate resin and cellulose triacetate resin and the like. Among them, polyethylene terephthalate resin, polyvinyl chloride resin, polypropylene resin and cellulose triacetate resin are more preferable for the above-mentioned properties.

Furthermore, in applications for observing recorded images by reflected light, it is preferable that these resin sheets or films be opaque such as white caused by addition of colorants etc. In these cases, the substrate 2 may be paper such as synthesized paper or coated paper. Moreover, translucent substrates may be used in illumination applications. For the purpose of improving an adhesive property with a layer formed on the substrate 2, a primer layer 5 may be provided on the surface of the substrate 2 or known treatment for making easier adhesion such as corona discharging treatment may be carried out.

Materials for constituting the primer layer 5 may be selected from materials having ordinary adhesive property such as linear polyesters and isocyanates.

Image Receiving Layer

The image receiving layer 3 provided on one surface of the above-mentioned substrate is formed directly or via the primer layer on the substrate. It is preferably made of a resin having a toner fixing property and a superior wetting property for color toners, particularly in OHP application of a full-color electrophotographic system.

Examples of the resin forming the image receiving layer may include polyolefin resins such as polyethylene and polypropylene; polyvinyl chloride; polyvinylidene chloride; polyvinyl acetate; vinyl chloride-vinyl acetate copolymer; polyacrylates; polyethylene terephthalate; polybutylene terephthalate; polystyrene type resins; polyamide type resins; copolymers of olefins such as ethylene and propylene with other vinyl monomers; ionomer; cellulose type resins such as ethylcellulose and cellulose acetate; as well as polycarbonate resins. Particularly preferable ones are vinyl type resins, polyester type resins and vinyl chloride-vinyl acetate copolymer resins.

The image receiving layer is formed by adding various assistants if required to the above-mentioned resin, dissolving or dispersing the resin in a suitable solvent to make a composition, applying the composition on a substrate sheet by means of a known method such as forming means of gravure printing, screen printing and reverse roll coating using a gravure plate and then drying.

A thickness of the image receiving layer is generally 0.1–10 $\mu$m on dry basis.

Furthermore, examples of the assistant added to the image receiving layer for the electrophotographic system may include fluorine type polymers such as ethylene tetrafluoride polymer and ethylene-ethylene tetrafluoride polymer; stearates such as zinc stearate; organic polymers such as polyethylene and polystyrene; inorganic fine particles such as silica and alumina; wax; silicon oil; surfactants, plant oils, animal oils and mineral oils with an object to provide a slipping property. Among them, fluorinated polymers are most suitable because of their own superior surface lubricancy.

In addition, it is possible to add fine particles of organic polymer such as polyolefin fine particles for example polyethylene, polystyrene fine particles, polyacrylic fine particles, ethylene-acrylic acid copolymer fine particles; inorganic fillers such as silica, kaolin, clay, talc, silicious stone, aluminum hydroxide, titanium dioxide, calcium carbonate, aluminum sulfate and zinc oxide; as well as glass bead fine particles in the image receiving layer with an object to prevent double conveyance due to blocking produced when the image receiving sheet being supplied in a printer. However, they should be added in an amount not to damage transparency of the image receiving layer for OHP applications.

Backing Layer

The backing layer 4 according to the present invention is formed on other surface, that is the reverse side, of the substrate having the provided image receiving layer and contains a binder for the backing layer, a component of a silicon containing compound, and a particle.

Examples of the binder used in the backing layer 4 may include halogenated polymers such as polyvinyl chloride and polyvinylidene chloride; vinyl type resins such as polyvinyl acetate, ethylene-vinyl acetate copolymer, vinyl chloride-vinyl acetate copolymer, polyacrylates, polystyrene and polystyrene-acryl; acetal type resins such as polyvinylformal, polyvinylbutyral and polyvinylacetal; saturated or unsaturated various polyester type resins; polycarbonate type resins; cellulose type resins such as cellulose acetate; polyolefin type resins; urea resins; melamine resins; polyamido type resins such as benzoguanamine resins. These resins may be used alone or optionally blended within a compatible range.

In such a case that other resins being used in admixture, particularly in such a case that transparency being required such as OHP application, it is necessary to select and use resins having good compatibility.

Furthermore, thermoplastic resins having active hydrogen are preferable among the above-mentioned resins. That is, it is particularly preferable that at least one kind of the binder resins for the backing layer have active hydrogen. It is preferable that active hydrogen be present at terminal end of the thermoplastic resins with taking into consideration of stability of various thermoplastic resins. Furthermore, in the case that vinyl type resins being used, a content of vinyl alcohol therewithin is preferably 30% by weight or less.

For example, in the case that a silicon containing isocyanate described below being used as the silicon containing compound, the binder itself reacts and cures too much by reaction with one kind of lubricant, i.e., the silicon containing isocyanate compound, if the content of active hydrogen in the thermoplastic resins is too high. Thus, the lubricant does not breed out on the surface of the backing layer. As the result, it cures and fixes within the inside of the backing layer, by which sufficient slipping property may not be appeared in the backing layer.

The backing layer according to the present invention comprises a binder, a component of a silicon containing compound and a particle. The component of a silicon containing compound is preferably a cured or polymerized silicon containing compound (for example, graft polymer or block polymer).

As the silicon containing compound, there are preferably used, in particular, silicon containing isocyanate compounds such as silyl isocyanate compounds expressed by the general formula (1):

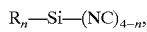

$$R_n\text{—Si—}(NC)_{4-n},$$

wherein n denotes an integer of 0, 1, 2 or 3 and R is substituted or unsubstituted alkyl group, aryl group or vinyl group.

A monomer expressed by the above-mentioned general formula (1) that functions as the lubricant is added to a coating solution for the backing layer and dry cured by heating, to obtain the backing layer having the following effects.

(a) Since it is a monomer, compatibility thereof with the thermoplastic resin constituting the backing layer is good.

(b) Since it is a monomer, it tends to breed out easily on the surface of the backing layer even when coated in a small added amount, thus superior conveyance property is obtained in an electrophotographic copier or printer.

(c) Since the reaction rate is fast and the reaction is carried out at a relatively low temperature, aging is not necessary and thus productivity is high.

Furthermore, in the case that the resin having active hydrogen being used as the binder resin in the backing layer, the following effects are further obtained.

(d) Since the monomer can be bonded with the binder resin having active hydrogen on the surface of the backing layer, rubbing damage resistance of a thermal transfer image receiving sheet is improved.

Thus, there are not occurred such problems that the backing layer is cut off during conveyance of supplied papers, that added particles are peeled off from the backing layer and that flaw or dirt is present on the image receiving sheet.

Furthermore, it is preferable in the present invention that the coating solution for the backing layer contain one kind or more modified silicone(s) having active hydrogen expressed by the following general formula (2).

Herein, as the modified silicone having active hydrogen, there may be used silicone modified with hydroxyl group, silicone modified with carboxyl and silicone modified with amino. The silicone modified with hydroxyl group is preferably used from an aspect of reactivity.

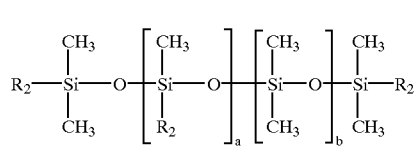

(2)

Herein, $R_2$ may be —$CH_3$ or —$(CH_2)_m OH$ in the case of the silicone modified with hydroxyl group; —$CH_3$ or —$(CH_2)_n COOH$ in the case of the silicone modified with carboxyl; and —$CH_3$ or $C_3H_6NH_2$ in the case of the silicone modified with amino. Furthermore, a methyl group part in the above-mentioned modified silicones may be ethyl group, phenyl group and 3,3,3-trifluoropropyl group.

According to the present invention, the silicon containing compound expressed by the general formula (1) and if necessary the modified silicone having active hydrogen expressed by the general formula (2) are added as lubricants to the coating solution for the backing layer. However, conventionally used lubricants may be used together. A total added amount is preferably 0.5–10% by weight based on the resin in the backing layer even for the cases that several kinds of lubricant being used.

According to the present invention, such a case that the binder and the silicon containing compound are not reacted mutually is also included within a range of the invention.

An inorganic or organic fine particle is added in the backing layer for prevention of blocking with the image receiving side and improvement of slipping property.

Examples of the inorganic fine particle may include a fine particle of silica, talc, alumina, kaolin, clay, calcium carbonate, magnesium hydroxide and magnesium carbide.

Examples of the organic fine particle may include a fine particle of acrylic resins, benzoguanamine resins, silicone resins, fluorine type resins, crosslinked urea resins, melamine resins and polycarbonate resins.

Among the above-mentioned particle, in particular, a spherical organic fine particle is preferably used.

In the case of the spherical particle, it is dispersed in the backing layer, thus touch feeling after imaging is good without any oily feeling on the surface of imaged product. After stored in a piled state of image receiving sheets without intermediate papers, the image is not subject to deterioration.

An added amount of the particle is preferably within 0.1–5% by weight based on the total solid content of the backing layer. If the added amount is less than 0.1% by weight, conveyance property is insufficient. On the other hand, if it is above 5% by weight, transparency is insufficient particularly in the case for OHP application.

A size of the particle used in the backing layer is preferably as follows.

There are relationships of $0.5a \leq t < a$ and $a-t \geq 0.5 \ \mu m$, wherein a is a particle diameter and t is a coated amount (coated thickness) of a binder resin in a backing layer (see FIG. 3).

That is, the particle diameter a of the backing layer is larger than the coated amount (coated thickness) t of the binder resin in the backing layer. Also, the coated amount (coated thickness) t of the binder resin in the backing layer is larger than a half of the particle diameter a.

By setting such relationships between the particle diameter a of the backing layer and the coated amount (coated thickness) t of the binder resin in the backing layer, there is no peeling off of the particle from the backing layer due to mutual rubbing of image receiving sheets and thus it is difficult to produce flaws on the image receiving sheet.

In the backing layer, various additives may be added if required furthermore. But, in the case that transparency being necessary such as for OHP application., an added amount of the additive is within a range not to lose necessary transparency.

The above-mentioned resin, the above-mentioned component of a silicon compound and the particle are added optionally with additives if necessary and blended sufficiently with a solvent or diluent etc., to prepare a coating solution for the backing layer. The solution is coated on the above-mentioned substrate by forming means such as gravure printing, screen printing and reverse roll coating using a gravure plate, and then dried, to obtain the backing layer.

Furthermore, in order to provide an antistatic property, the following antistatic agents may be blended in the coating solution for the backing layer.

Antistatic agents: aliphatic acid esters, sulphate esters, phosphate esters, amides, quaternary ammonium salts, betaines, amino acids, acrylic resins and ethylene oxide adducts.

An added amount of the antistatic agent is preferably 0.1–2.0% by weight based on the resin.

In the image receiving sheet according to the present invention, a coated amount of the backing layer is preferably 0.5 g/m$^2$–5 g/m$^2$ on dry basis. If the coated amount is less than 0.5 g/m$^2$, conveyance property is insufficient in a printer. If it is above 5 g/m$^2$, transparency of the image receiving sheet is insufficient.

Antistatic Layer

In the image receiving sheet according to the present invention, antistatic layers 6, 7 may be arranged on the uppermost surface of the image receiving layer side and/or the backing layer side of the image receiving sheet.

The antistatic layer is comprised mainly of a binder and an antistatic agent. However, in the case that the antistatic agent being adhered by itself, the antistatic layer 3 may be comprised without any binder.

Examples of the above-mentioned binder may include polyester resins, polyurethane resins, polyacrylic resins, polyvinylformal resins, epoxy resins, polyvinylbutyral resins, polyamide resins, polyether resins, polystyrene resins and styrene-acrylic copolymer resins.

Examples of the material used for the antistatic agent may include cationic antistatic agents such as quaternary ammonium salts and polyamine derivatives; anionic antistatic agents such as alkylphosphates; nonionic antistatic agents such as aliphatic acid esters; sulfonated polyaniline, chemically doped polyacetylene, polyparaphenylenevinylene, polyparaphenylene sulfide, chemically polymerized and doped polypyrrol, polythiophene, polyaniline, thermally treated products of phenol resins, thermally treated polyamides and thermally treated perylene anhydride.

For making the antistatic layer, coating solution comprising the above-mentioned materials is applied on the uppermost surface of the image receiving sheet by means of conventional coating methods such as gravure coater, roll coater and wire bar, and dried.

A coated amount (coated thickness) of the antistatic layer is within a range of about 0.05–1.0 μm, preferably 0.1–0.5 μm, calculated as a solid content of the coating solution. If the coated amount (coated thickness) is less than that range, properties as the antistatic layer are insufficient. On the other hand, if the coated amount (coated thickness) is more than the above-mentioned range, it is economically disadvantage since the above-mentioned properties are not improved in proportion to the thickness thereof. Furthermore, it is not preferable because of decreased density in an image obtained by an electrophotographic copier or printer.

In the image receiving sheet according to the present invention constituted as above, coefficient of kinetic friction due to piling of the image receiving sheets on front and back sides is preferably within a range of 0.1–0.5. Within the range, conveyance property in a printer becomes good. In order to control coefficient of kinetic friction within the above-mentioned range, a mixing proportion of the silicon compound component and particles in the backing layer may be adjusted.

The present invention will be explained concretely with the following examples. Wherein, parts and % are on weight basis unless otherwise stated.

At first, the following compositions for the backing layers were prepared.

| Backing layer 1 | |
| --- | --- |
| polyester resin ("Vylon 200" made by Toyo Boseki Co. Ltd.) | 10 parts |
| methylsilyl tri-isocyanate (n = 1 and R$_1$ = CH$_3$ in the general formula (1), "Orgatics SIC-434" made by Matsumoto Kosho Co. Ltd.) | 2.5 parts |
| methylethylketone/toluene (weight mixing ratio: 1/1) | 100 parts |
| Backing layer 2 | |
| butyral resin ("#3000K" made by Denki Kagaku Kogyo Co. Ltd.) | 10 parts |
| methylsilyl tri-isocyanate (n = 1 and R$_1$ = CH$_3$ in the general formula (1), "Orgatics SIC-434" made by Matsumoto Kosho Co. Ltd.) | 2.5 parts |
| methylethylketone/toluene (weight mixing ratio: 1/1) | 100 parts |
| Backing layer 3 | |
| vinyl chloride-vinyl acetate-hydroxyacrylate copolymer resin | 10 parts |
| methylsilyl tri-isocyanate (n = 1 and R$_1$ = CH$_3$ in the general formula (1), "Orgatics SIC-434" made by Matsumoto Kosho Co. Ltd.) | 2.5 parts |
| methylethylketone/toluene (weight mixing ratio: 1/1) | 100 parts |
| Backing layer 4 | |
| acrylsilicone resin ("Simac US450" made by Nagase Sangyo Co. Ltd.) | 5 parts |
| polyester resin ("TP220S30MX" made by Nippon Gosei Kagaku Co. Ltd.) | 10 parts |
| isopropylalcohol | 100 parts |
| Backing layer 5 | |
| polyester resin ("Vylon 200" made by Toyo Boseki Co. Ltd.) | 10 parts |
| polyethylene wax | 1.0 parts |
| methylethylketone/toluene (weight mixing ratio: 1/1) | 100 parts |
| Backing layer 6 | |
| polyester resin ("Vylon 200" made by Toyo Boseki Co. Ltd.) | 10 parts |
| silicone modified with hydroxyl group | 0.5 parts |
| isocyanate compound ("Takenate A-14" made by Takeda Yakuhin Kogyo Co. Ltd.) | 0.8 parts |
| methylethylketone/toluene (weight mixing ratio: 1/1) | 100 parts |

EXAMPLE 1

The above-mentioned composition for the backing layer 1 containing furthermore 0.12 parts of acrylic particles ("MX150" made by Soken Kagaku Co. Ltd., particle diameter: 1.5 μm) with a thickness of 0.75 μm on dry basis was applied on the substrate described below.

Furthermore, on the other surface of the substrate, the following composition for an image receiving layer was applied with a thickness of 3 μm on dry basis, to form an image receiving sheet of Example 1.

| Substrate | |
| --- | --- |
| polyethylene terephthalate film with a thickness of 75 μm | |
| Image receiving layer | |
| polyester resin (polymer of fumaric acid and propylene glycol modified bisphenol A, glass transition temperature: 60° C., softening point: 100° C.) | 30 parts |

-continued

| | |
|---|---|
| silica fine particles (average particle diameter: 5 μm) | 0.15 parts |
| methylethylketone | 35 parts |
| toluene | 35 parts |

EXAMPLE 2

An image receiving sheet of Example 2 was prepared according to the same procedure as that in Example 1 except that the backing layer was made by applying the above-mentioned composition for the backing layer 2 containing furthermore 0.12 parts of acrylic fine particles ("MX150" made by Soken Kagaku Co. Ltd., particle diameter: 1.5 μm) with a thickness of 0.75 μm on dry basis.

EXAMPLE 3

An image receiving sheet of Example 3 was prepared according to the same procedure as that in Example 1 except that the backing layer was made by applying the above-mentioned composition for the backing layer 3 containing furthermore 0.12 parts of acrylic fine particles ("MX150" made by Soken Kagaku Co. Ltd., particle diameter: 1.5 μm) with a thickness of 0.75 μm on dry basis.

EXAMPLE 4

An image receiving sheet of Example 4 was prepared according to the same procedure as that in Example 1 except that the backing layer was made by applying the above-mentioned composition for the backing layer 4 containing furthermore 0.12 parts of acrylic fine particles ("MX150" made by Soken Kagaku Co. Ltd., particle diameter: 1.5 μm) with a thickness of 0.75 μm on dry basis.

EXAMPLE 5

An image receiving sheet of Example 5 was prepared according to the same procedure as that in Example 1 except that the backing layer was made by applying the above-mentioned composition for the backing layer 1 containing furthermore 0.12 parts of acrylic fine particles ("MX300" made by Soken Kagaku Co. Ltd., particle diameter: 3.0 μm) with a thickness of 1.8 μm on dry basis.

EXAMPLE 6

An image receiving sheet of Example 6 was prepared according to the same procedure as that in Example 1 except that the backing layer was made by applying the above-mentioned composition for the backing layer 6 containing furthermore 0.12 parts of acrylic fine particles ("MX150" made by Soken Kagaku Co. Ltd., particle diameter: 1.5 μm) with a thickness of 0.75 μm on dry basis.

Comparative Example 1

An image receiving sheet of Comparative Example 1 was prepared according to the same procedure as that in Example 1 except that the backing layer was made by applying the above-mentioned composition for the backing layer 5 containing furthermore 0.12 parts of acrylic fine particles ("MX150" made by Soken Kagaku Co. Ltd., particle diameter: 1.5 μm) with a thickness of 0.75 μm on dry basis.

Comparative Example 2

An image receiving sheet of Comparative Example 2 was prepared according to the same procedure as that in Example 1 except that the backing layer was made by applying the above-mentioned composition for the backing layer 1 containing furthermore 0.12 parts of acrylic fine particles ("MX150" made by Soken Kagaku Co. Ltd., particle diameter: 1.5 μm) with a thickness of 0.5 μm on dry basis.

Comparative Example 3

An image receiving sheet of Comparative Example 3 was prepared according to the same procedure as that in Example 1 except that the backing layer was made by applying the above-mentioned composition for the backing layer 1 containing furthermore 0.12 parts of acrylic fine particles ("MX150" made by Soken Kagaku Co. Ltd., particle diameter: 1.5 μm) with a thickness of 1.8 μm on dry basis.

Comparative Example 4

An image receiving sheet of Comparative Example 4 was prepared according to the same procedure as that in Example 1 except that the backing layer was made by applying the above-mentioned composition for the backing layer 1 containing furthermore 0.12 parts of acrylic fine particles ("MX150" made by Soken Kagaku Co. Ltd., particle diameter: 1.5 μm) with a thickness of 1.2 μm on dry basis.

Comparative Example 5

An image receiving sheet of Comparative Example 5 was prepared according to the same procedure as that in Example 1 except that the backing layer was made by applying the above-mentioned composition for the backing layer 1 containing furthermore 0.12 parts of acrylic fine particles ("MX150" made by Soken Kagaku Co. Ltd., particle diameter: 1.5 μm) with a thickness of 1.2 μm on dry basis in which the amount of methylsilyl tri-isocyanate is reduced to 0.1 parts.

Comparative Example 6

An image receiving sheet of Comparative Example 6 was prepared according to the same procedure as that in Example 1 except that the backing layer was made by applying the above-mentioned composition for the backing layer 1 containing furthermore 0.12 parts of acrylic fine particles ("MX150" made by Soken Kagaku Co. Ltd., particle diameter: 1.5 μm) with a thickness of 1.2 μm on dry basis in which the amount of methylsilyl tri-isocyanate is increased to 10 parts.

Conveyance property, rubbing damage resistance, image quality, touch feeling, friction coefficient and storability were evaluated by the following methods with use of the image receiving sheets of the above-mentioned Examples and Comparative Examples.
(Evaluation Methods)
Conveyance Property
Images were made by using a color page printer HT-4551-11 made by Hitachi Seisakusho Co., Ltd. and conveyance property of the sheets was evaluated. Judging standards are as follows.
○: The image receiving sheet was conveyed without problem.
X: The image receiving sheet was jammed during conveyance or plugged.
Rubbing Damage Resistance
Images were made by using a color page printer HT-455-11 made by Hitachi Seisakusho Co., Ltd. and the presence of flaw on the surface of the imaged product was observed macroscopically.

Judging standards are as follows.
o: Flaw due to conveyance was not recognized.
X: Flaw due to conveyance was recognized.
Image Quality
Images were made by using a color page printer HT-4551-11 made by Hitachi Seisakusho Co., Ltd., injecting the imaged product with OHP and image quality thereof was evaluated macroscopically.
Judging standards are as follows.
o: Good quality of the image was obtained.
Δ: Although image density was good, dirt was adhered.
X: Image quality was bad, and unevenness in the image, bad density and graying etc. were occurred
Touch Feeling
Images were made by using a color page printer HT-4551-11 made by Hitachi Seisakusho Co., Ltd. and touch feelings of the sheets were evaluated by hand touching.
Judging standards are as follows.
o: There was no oil adhesion.
X: There was oil adhesion.
Friction Coefficient
As to the image receiving sheet before imaging, kinetic (dynamic) friction coefficients of the sheets were measured between the front and the back sides thereof.
Storability
Images were made by using a color page printer HT-4551-11 made by Hitachi Scisakusho Co., Ltd. and the imaged products were stored with two sheets by piling for one week at the room temperature, and thereafter the image quality thereof was evaluated macroscopically.
Judging standards are as follows.
o: Any unevenness due to oil was not recognized.
X: Unevenness due to oil was occurred.
(Evaluated Results)
Evaluated results of respective Examples and Comparative Examples are shown in Table 1.

TABLE 1

| | Conveyance property | Rubbing damage resistance | Image quality | Touch feeling | Friction coefficient | Storability |
|---|---|---|---|---|---|---|
| Example 1 | o | o | o | o | 0.18 | o |
| Example 2 | o | o | o | o | 0.18 | o |
| Example 3 | o | o | o | o | 0.18 | o |
| Example 4 | o | o | o | o | 0.18 | o |
| Example 5 | o | o | o | o | 0.20 | o |
| Example 6 | o | o | o | o | 0.30 | o |
| Comparative Example 1 | o | o | X | o | 0.20 | o |
| Comparative Example 2 | Δ | X | Δ | o | 0.40 | o |
| Comparative Example 3 | o | o | o | X | 0.05 | X |
| Comparative Example 4 | o | o | o | X | 0.15 | X |
| Comparative Example 5 | X | o | o | o | 0.8 | o |
| Comparative Example 6 | o | o | o | o | 0.05 | o |

The image receiving sheet according to the present invention has an image receiving layer on one surface of a substrate and a backing layer provided on a back surface of the substrate, in which a silicon compound component and a particle are contained in a binder of the backing layer. In a preferred embodiment, by using an isocyanate compound expressed by the general formula (1) as the silicon compound component, the compound is reacted with a binder resin having a reactive group in the backing layer and cured. Furthermore, the particle is dispersed and fixed by the reacted and cured binder resin. Therefore, conveyance property thereof in an electrophotographic copier and printer becomes better and there is no flaw or dirt on the surface. Furthermore, a part of the backing layer is not subject to setoff on the imaged surface, thus the image receiving sheet having a superior image quality can be obtained.

Moreover, since the particle is dispersed in the backing layer, touch feeling thereof after imaging is good and produced image is not deteriorated after piling of the image receiving sheets without intermediate papers being put between.

Furthermore, by adjusting a mixing proportion of the silicon compound component and the particle in the backing layer, kinetic friction coefficient by piling of the image receiving sheets on front and back sides can be set within a range of 0.1–0.5, thus conveyance property in a printer becomes better.

What is claimed is:

1. An image receiving sheet comprising:
   a substrate;
   an image receiving layer formed on one surface of said substrate; and
   a backing layer formed on other surface of said substrate,
   said backing layer comprising a binder, a particle and a component of a silicon containing compound.

2. The image receiving sheet according to claim 1, wherein said component of a silicon containing compound is a cured/polymerized silicon containing compound.

3. The image receiving sheet according to claim 1, wherein said silicon containing compound is a silicon containing isocyanate.

4. The image receiving sheet according to claim 3, wherein said silicon containing compound has the following general formula (1):

$$R_n\text{—Si—}(NCO)_{4-n} \qquad (1)$$

wherein n denotes an integer of 0, 1, 2 or 3, and R is substituted or unsubstituted alkyl group, aryl group or vinyl group.

5. The image receiving sheet according to claim 1, wherein at least one kind of resins constituting the binder in said backing layer has an active hydrogen.

6. The image receiving sheet according to claim 1, wherein said particle is a spherical organic fine particle.

7. The image receiving sheet according to claim 1, wherein an added amount of said particle is 0.1–5% by weight.

8. The image receiving sheet according to claim 1, wherein a diameter of said particle (a) and a coated amount (coated thickness) of the backing layer (t) has relationships of $0.5a \leq t < a$ and $a - t \geq 0.5 \ \mu m$.

9. The image receiving sheet according to claim 1, wherein dynamic friction coefficient of the sheet by piling of two image receiving sheets on front and back surfaces is within a range of 0.1–0.5.

* * * * *